(12) United States Patent
Choi et al.

(10) Patent No.: US 6,594,492 B2
(45) Date of Patent: *Jul. 15, 2003

(54) ANCHOR MSC INFORMATION RETRIEVAL FROM A SERVING MSC FOLLOWING A COMPLETED INTER-EXCHANGE HANDOFF

(75) Inventors: Felix Choi, Brossard (CA); Michel Houde, Ville St-Laurent (CA); Sorin Surdila, Montral (CA)

(73) Assignee: Telefonaktiebolaget L M Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,319

(22) Filed: May 21, 1999

(65) Prior Publication Data

US 2002/0042271 A1 Apr. 11, 2002

Related U.S. Application Data

(60) Provisional application No. 60/089,481, filed on Jun. 16, 1998.

(51) Int. Cl.[7] .................................................. H04Q 7/20
(52) U.S. Cl. ........................ 455/436; 455/437; 455/438; 370/331
(58) Field of Search ................................ 455/422, 424, 455/425, 428, 426, 432, 433, 436, 437, 438, 439, 440, 414; 370/331, 310

(56) References Cited

U.S. PATENT DOCUMENTS

| | | | | |
|---|---|---|---|---|
| 4,593,155 A | * | 6/1986 | Hawkins | 179/2 |
| 5,394,540 A | * | 2/1995 | Barrington et al. | 703/21 |
| 5,659,598 A | * | 8/1997 | Byrne et al. | 455/426 |
| 5,771,275 A | * | 6/1998 | Brunner et al. | 370/385 |
| 5,862,484 A | * | 1/1999 | Lee | 455/445 |
| 5,873,033 A | * | 2/1999 | Hjern et al. | 455/417 |
| 5,901,145 A | * | 5/1999 | Sawyer | 370/320 |
| 5,911,122 A | * | 6/1999 | Corriveau et al. | 455/432 |
| 5,930,713 A | * | 7/1999 | Nguyen | 455/440 |
| 5,936,948 A | * | 8/1999 | Sicher | 370/314 |
| 6,038,449 A | * | 3/2000 | Corriveau et al. | 455/439 |
| 6,070,076 A | * | 5/2000 | Valentine | 455/445 |
| 6,125,276 A | * | 9/2000 | Lupien | 370/331 |
| 6,169,900 B1 | * | 1/2001 | Lahtinen | 455/436 |
| 6,212,380 B1 | * | 4/2001 | Laatu | 455/436 |
| 6,230,013 B1 | * | 5/2001 | Wallentin et al. | 370/331 |
| 6,246,876 B1 | * | 6/2001 | Hontzeas | 455/436 |
| 6,285,880 B1 | * | 9/2001 | Gagnon et al. | 455/432 |
| 6,317,594 B1 | * | 11/2001 | Gossman et al. | 455/414 |

FOREIGN PATENT DOCUMENTS

| | | |
|---|---|---|
| WO | WO 98/00988 | 1/1998 |
| WO | WO 98/06226 | 2/1998 |
| WO | WO 98/10596 | 3/1998 |

OTHER PUBLICATIONS

"TR–45: Enhanced Wireless 9–1–1, Phase 2" PN–3890, Rev. 3+ pp. 1–148, Mar. 11, 1999.
"Chapter 3: Emergency Services Network Description", Path C Long Proposal, Rev. 6 Draft, PN–3890.3, pp. 20–52, Jul. 1, 1998.

* cited by examiner

Primary Examiner—William Trost
Assistant Examiner—Congvan Tran
(74) Attorney, Agent, or Firm—Jenkens & Gilchrist; Sandra Beauchesne

(57) ABSTRACT

In the context of a completed inter-exchange handoff of a mobile station communication, an anchor exchange may request certain call related information from a currently serving exchange. This request is made through use of an inter-exchange information request message issued from the anchor exchange and sent (perhaps through one or more tandem exchanges) to the serving exchange. Responsive thereto, the serving exchange processes the request, obtains the requested call related information, and returns the requested information in an inter-exchange information request return result message. The information request message may comprise a newly defined ANSI-41 message, a vendor proprietary extension to the ANSI-41 message set, or an enhancement to an existing ANSI-41 message.

12 Claims, 5 Drawing Sheets

ANCHOR MSC INFORMATION RETRIEVAL FROM A SERVING MSC FOLLOWING A COMPLETED INTER-EXCHANGE HANDOFF

PRIORITY CLAIM

The present application claims priority from previously filed U.S. Provisional Application for Patent Serial No. 60/089,481, filed Jun. 16, 1998, and entitled "System and Method for Retrieving Information from a Serving Mobile Switching Center", the disclosure of which is hereby incorporated by reference.

BACKGROUND OF THE INVENTION

1. Technical Field of the Invention

The present invention relates to inter-exchange handoff and, in particular, to network operations supporting anchor mobile switching center retrieval of information from a serving mobile switching center following completion of such an inter-exchange handoff.

2. Description of Related Art

Reference is now made to FIG. 1 wherein there is shown a cell diagram illustrating an exemplary cell site configuration for a cellular communications network 100 in which the present invention may be implemented. The cellular communications network 100 operates in accordance with one of a number of known air interface types including, for example, a digital time division multiple access (TDMA) protocol. In a digital TDMA cellular telephone network, for example, each cell site (comprising either an omnidirectional cell, as shown for ease of illustration, or a sector cell) operates with an assigned set of transmission frequencies selected from one or more of the available cellular communications authorized hyperbands (e.g., 800 MHZ, 1900 MHZ, and the like) and frequency bands (A, B, and the like) therein. The set of frequencies assigned to each cell 112 includes frequencies supporting both at least one control channel and a plurality of traffic channels, with the control and traffic channels operable in either or both an analog and/or a digital mode. Sets of assigned frequencies are different for adjacent cells 112, and such sets are not repeated for use by other cells except for those cells that are far enough away from each other to minimize the likelihood of adjacent or co-channel interference.

In the network 100, a base station 114 is provided for each of the cells 112. The base stations 114 engage in simultaneous communications with plural mobile stations 116 operating roughly within the area of the associated cell 112. The control channel assigned to each cell 112 is used to carry system control signals between the base station 114 and proximately located mobile stations 116, and also to assist in the network with mobile station cell reselection. Such control signals include call originations, page signals, page response signals, location registration signals, traffic channel assignments, maintenance instructions, and cell selection or reselection instructions. The traffic channels provided in each cell 112 are used to carry subscriber voice or data communications between the base station 114 and proximately located mobile stations 116 and also to assist in the handoff operation.

The base stations 114 are illustrated as being positioned at or near the center of each of the cells 112. However, depending on geography and other known factors, the base stations 114 may instead be located at or near the periphery of, or otherwise away from the centers of, each of the cells. Each one of the base stations 114 includes a transmitter, a receiver, and a base station controller (none shown) connected to one or more directive antennae (also not shown) in a manner and with a configuration well known in the art.

The base stations 114 further communicate via signaling links and voice trunks 122 with a central control station, commonly referred to as a mobile switching center 118, which functions to control operation of the network 100. A boundary 134 is shown in bold in FIG. 1 to differentiate between those cells 112 (collected in area 132(1)) serviced by a first mobile switching center 118(1), and those cells (collected in area 132(2)) serviced by a second mobile switching center 118(2). The mobile switching centers 118 are interconnected with each other and to the public switched telephone network (PSTN) 120 by signaling links and voice trunks 124. The mobile switching centers 118 operate to selectively connect subscriber voice and data communications to the mobile stations 116 through its base stations 114. Thus, the mobile switching center 118 controls system operation through and in response to the transmission of signals over the control channels to set-up on the traffic channels calls that are either originated by or terminated at the mobile stations 116.

As the mobile stations 116 move within the service area of the network 100, instances arise where a mobile station passes between two cells 112 within a single area 132, or from one cell in a first area 132(1) to another cell in a second area 132(2). In moving between the cells 112, the mobile stations 116, in conjunction with base station 114 collected information and also orders exchanged with and between the mobile switching centers 118, have an opportunity through hand-off to change the base station through which cellular radio communications are being effectuated. For example, a mobile station 116(1) is shown moving in the direction of arrow 126(1) between two cells 112 from area 132(1) into area 132(2). Here, an inter-exchange hand-off must occur in order to continue providing call service to the mobile station 116(1). The mobile switching center 118 controls, through and in response to traffic channel signals, the hand-off of a subscriber communication from a traffic channel of one cell 112 to a traffic channel of another cell as the subscriber mobile station 116 roams throughout the cellular service area during an ongoing communication.

Reference is now additionally made to FIGS. 2A–2B wherein there is shown a signal flow and network operation diagram illustrating network operation in connection with a scenario wherein an inter-exchange hand-off is made from a cell 112(1) within a first area 132(1) generally towards cell 112(2) within a second area 132(2). The mobile station 116(1), operating if capable in accordance with known mobile assisted hand-off (MAHO) principles, periodically makes downlink signal strength measurements 202 on the traffic channel (of cell 112(1)) that is currently being used, and also periodically makes downlink signal strength measurements 204 on the control (i.e., measurement) channels of network identified cells 112, including cells 112(2) and 112(3), which neighbor the cell 112(1). These signal strength measurements are reported 206 to the base station 114(1) for the currently serving cell 112(1). The base station 114(1) concurrently makes uplink signal strength measurements 208 on the traffic channel that is currently being used by the mobile station 116(1).

The base station 114(1) processes the mobile station 116(1) reported 206 downlink signal strength measurements (202 and 204), if available, and the base station made uplink signal strength measurements (208) to determine first whether a hand-off is necessary (action 210) and second, if yes, to which candidate cells the hand-off could and/or should preferably occur (action 212). In this example, it is assumed that the base station 114(1) determines 210 from deteriorating measured uplink and/or downlink signal strengths that a hand-off is necessary. It is further assumed that an identification 212 is made of a plurality of candidate cells 112 for hand-off. These candidate cells 112 may include cells in the same first area 132(1) as the current cell 112(1) such as cell 112(3), as well as cells in other areas 132, such as cell 112(2) in second area 132(2). It will, of course, be understood that the decision to hand-off may instead be made by the mobile station 116(1) itself. A request 214 for hand-off including information comprising an identification of the currently serving cell 112(1), the traffic channel being used for communication with mobile station 116(1) in cell 112(1), the time slot (for a digital traffic channel) carrying the cellular communication, the digital voice color code (DVCC), and the list of potential candidate cells 112 for hand-off, is then sent by the base station 114(1) to the serving mobile switching center 118(1), comprising the serving exchange.

With respect to inter-exchange signaling and a potential for inter-exchange hand-off, the currently serving mobile switching center 118(1) signals 218 the cooperating mobile switching center 118(2), comprising the target exchange, requesting verification of connected base station 114 communications capability with the mobile station 116(1) (i.e., a hand-off measurement request). The signal 218, like the request 214 sent by the base station 114(1), includes information comprising an identification of the currently serving cell 112(1), the traffic channel being used for communication with mobile station 116(1) in cell 112(1), the time slot (for a digital traffic channel) carrying the cellular communication, and the digital voice color code (DVCC).

Responsive to receipt of the signal 218, the cooperating (target) mobile switching center 118, such as mobile switching center 118(2), determines in action 220 from the identification of the cell 112(1), which of its served cells, such as cell 112(2), are neighbors (i.e., candidate cells) for hand-off. As an alternative, this neighbor/candidate list may be provided by the currently serving mobile switching center 118(1). The cooperating mobile switching center 118(2) then signals 222 the base station 114, such as base station 114(2), for each of its connected candidate cells, such as cell 112(2), to make a verifying signal strength measurement (action 224) on the traffic channel currently being used by the mobile station 116(1) in the currently serving cell 112(1).

Additionally, at or about the same time, the mobile switching center 118(1) has similarly identified in action 220 which of its connected cells 112 are neighbors (i.e., candidate cells) to cell 112(1) for hand-off. The mobile switching center 118(1) then similarly signals 222 the base station 114 for each of its connected candidate cells 112, such as the cell 112(3), to make a verifying signal strength measurement (action 224) on the traffic channel currently being used by the mobile station 116(1) in the currently serving cell 112(1).

Each base station 114 instructed by a received signal 222 then reports 228 the results of the verification signal strength measurement to their serving mobile switching center 118 (in, for example, a hand-off measurement report). In the case of reports 228 made to cooperating mobile switching centers 118, such as mobile switching center 118(2), the reported verification signal strength measurements are forwarded 230 on to the mobile switching center 118(1). The verification signal strength measurement results are then processed (action 232) by the mobile switching center 118(1) to determine which one of the candidate cells 112 comprises the best (i.e., the target) cell for hand-off of the call 200 based on the success and strength of the verification signal strength measurement.

Assuming now that the identified target cell for hand-off comprises the cell 112(2) in the area 132(2), the serving mobile switching center 118(1) requests from the target mobile switching center 118(2) assignment and reservation of a traffic channel (and time slot therein for a digital traffic channel) for hand-off of the call 200 in signal 234. The base station 114(2) and mobile switching center 118(1) are then informed 236 of the assignment by the mobile switching center 118(2) of the traffic channel in the target cell 112(2). The mobile switching center 118(1) then signals 240 the mobile station 116(1) via the base station 114(1) for the currently serving cell 112(1) with a handover command directing the mobile station to switch to the assigned traffic channel (and time slot therein if appropriate) in the target cell 112(2). The mobile station 116(1) then tunes to and accesses 242 the assigned traffic channel (in the proper time slot). When the base station 114(2) detects the mobile station access (action 244), the mobile switching center 118(1), now comprising the anchor exchange, is informed 246, and the call 200 is switched 248 to the mobile switching center 118(2), now comprising the serving exchange, for further handling to complete the hand-off procedure.

It should be noted that the anchor exchange remains connected in handling the call following the inter-exchange handoff using the trunk connection 124. It should further be noted that additional inter-exchange handoffs subsequently may be performed (with the anchor exchange still remaining connected in handling the call). If path minimization techniques are implemented, the target exchange is substituted for the currently serving exchange by the inter-exchange handoff process. In the event no path minimization is implemented, the currently serving exchange becomes a tandem exchange (with the anchor exchange and tandem exchange still remaining connected in handling the call), and the target exchange becomes the new serving exchange.

Reference is now made to FIG. 3 wherein there is shown a message flow and network operation diagram illustrating operation of the network of FIG. 1 following an inter-exchange hand-off of FIGS. 2A–2B to push information from the anchor exchange down to the serving exchange. Although not illustrated, it will be understood that the process for pushing information from the anchor exchange to the serving exchange may implicate and pass through one or more tandem exchanges in cases where path minimization techniques are not implemented. In certain situations where it becomes necessary for the anchor exchange 300 to pass information on to the serving exchange 302 following an inter-exchange handoff, the anchor exchange may originate an ANSI-41 information forward message (INFOFWD) 304 for delivery to the serving exchange (see, TIA/EIA-41.3-D, Section 4.12). Parameters within the information forward message 304 contain the information at issue that must be delivered to the serving exchange 302. For example, changes in the message waiting status with respect to the currently being served mobile station 306 may need to be pushed down to the serving exchange, and the information forward message 304 provides the mechanism for information delivery. Other kinds of information that may be pushed down include: type of announcement/tones to play; message waiting information; and, CNI digits in ASCII format (representing a calling number or redirecting number). Responsive to receipt of the information forward message 304, the serving exchange 302 acts on the included information as is appropriate (action 308) and originates an information forward return result message (infofwd) 310 acknowledging receipt of the message and the taking of the appropriate action.

SUMMARY OF THE INVENTION

In the context of a completed inter-exchange handoff of a mobile station communication, an anchor exchange makes a request for certain information from a currently serving exchange relating to the currently being handled cellular call. Responsive to the request, the serving exchange obtains the requested call related information and issues a reply back to the anchor exchange including that information. The inter-exchange call related information request may comprise a suitably formulated ANSI-41 message whose included parameters identify the call related information that is being requested. The included parameters of a corresponding ANSI-41 return result message then provide the requested call related information to the anchor exchange.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
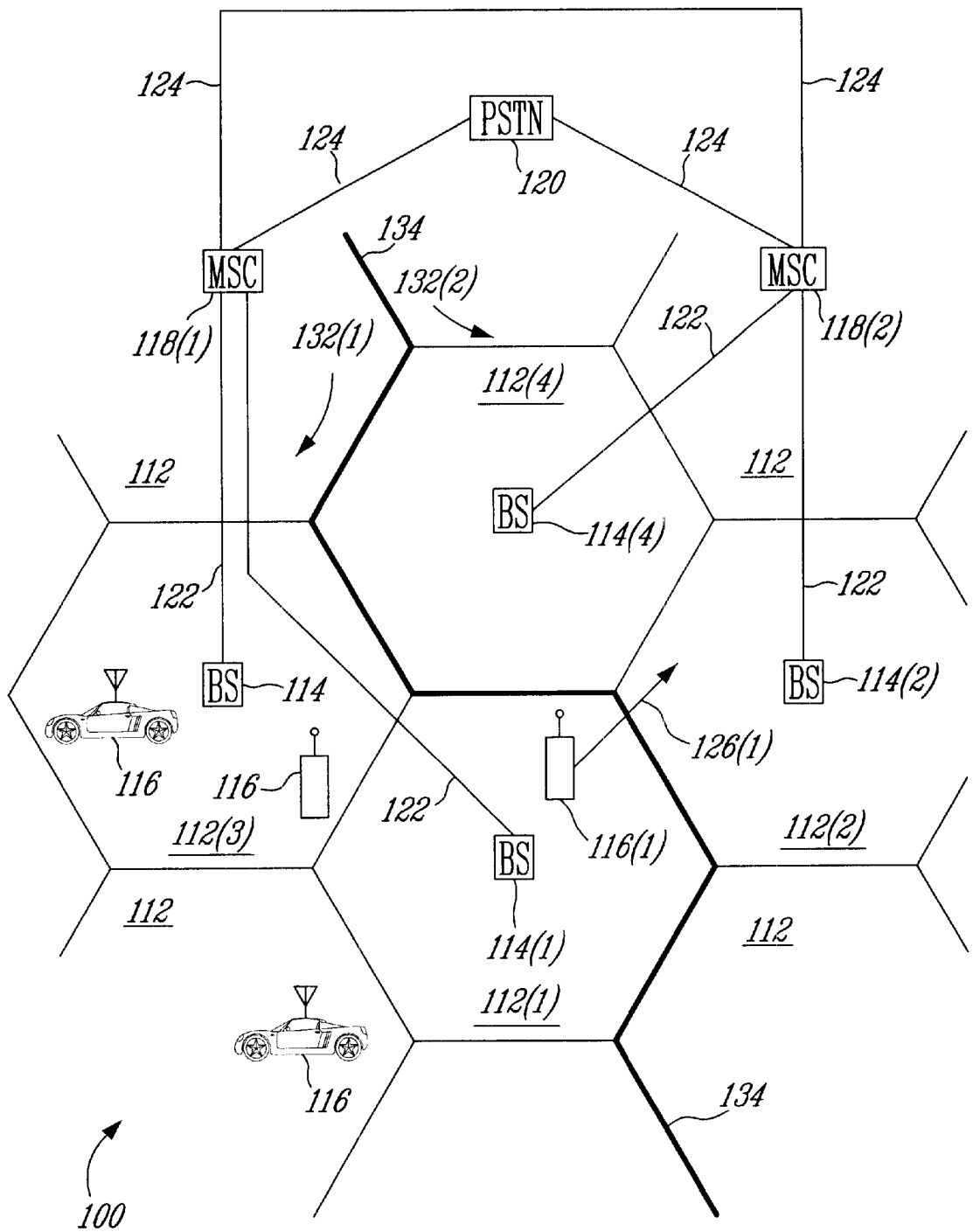
FIG. 1 is a cell diagram illustrating an exemplary cell configuration for a cellular telephone network in which the present invention may be implemented.
Figure 2A:
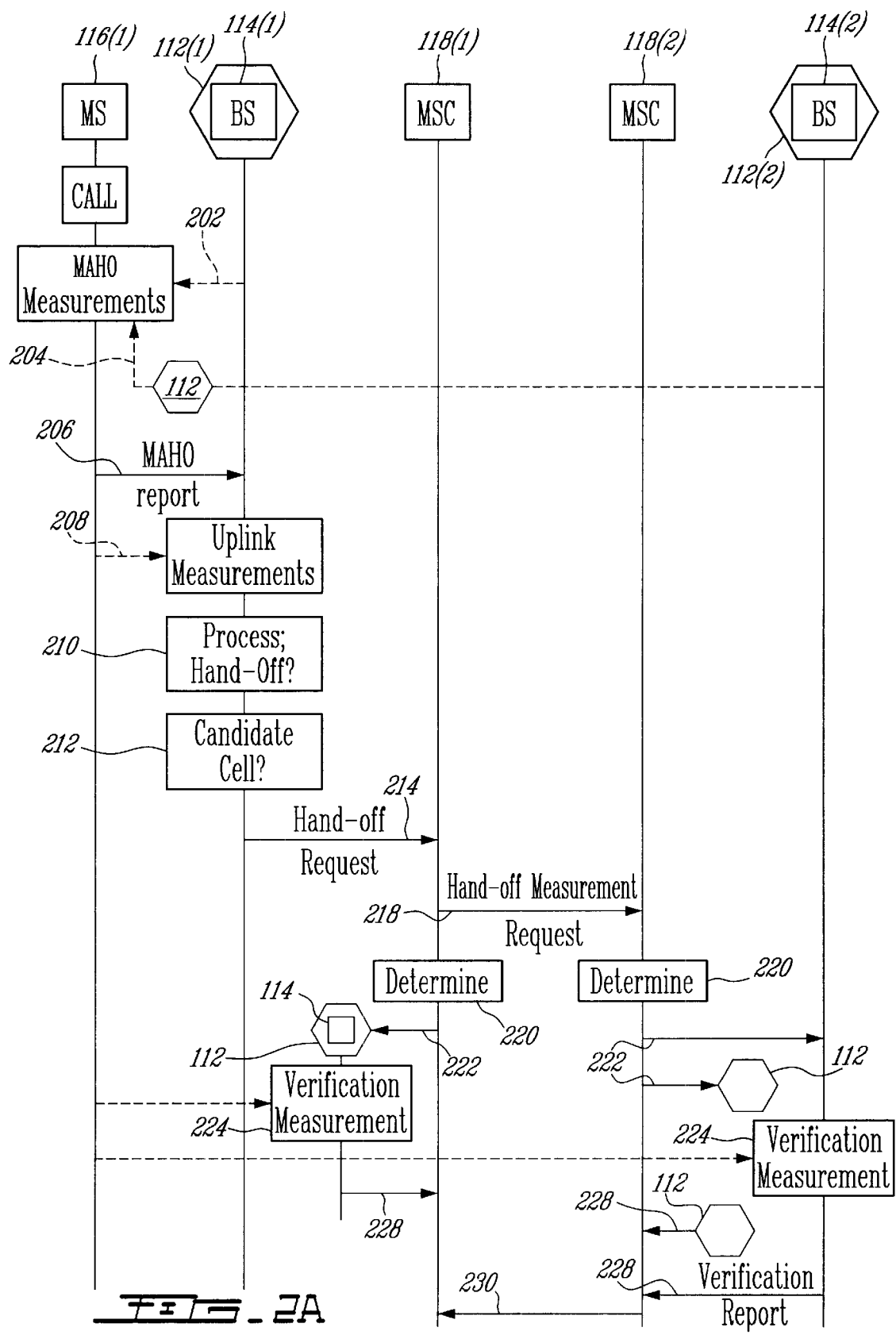
FIGS. 2A–2B are message flow and network operation diagrams illustrating operation of the network of FIG. 1 in connection with an inter-exchange hand-off.
Figure 2B:
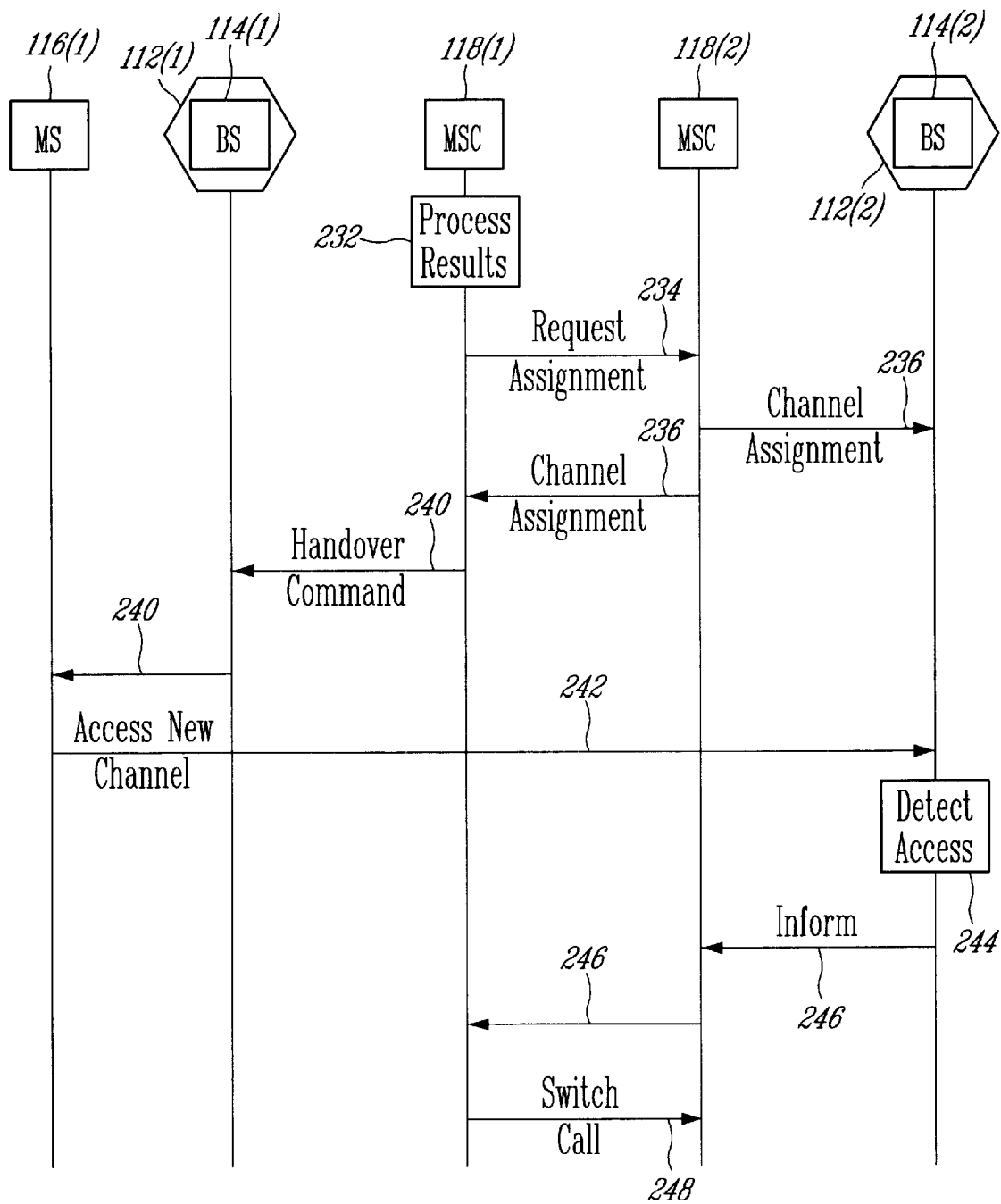
Figure 4:
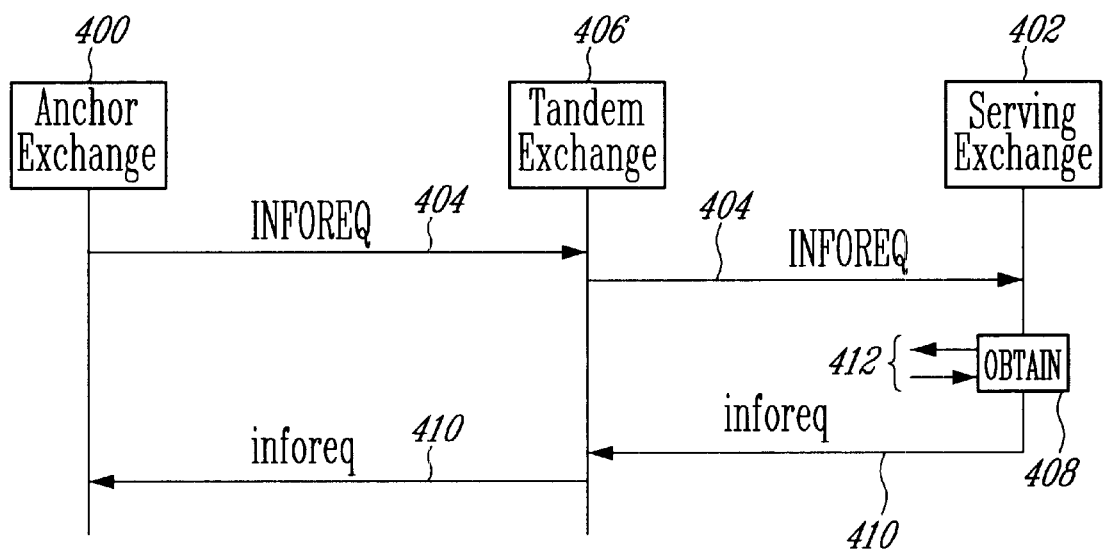
FIG. 4 is a message flow and network operation diagram illustrating operation of the network of FIG. 1 following an inter-exchange hand-off of FIGS. 2A–2B to have an anchor exchange request information from the serving exchange.

Reference is now made to FIG. 4 wherein there is shown a message flow and network operation diagram illustrating operation of the network of FIG. 1 following an inter-exchange hand-off of FIGS. 2A–2B to have an anchor exchange request information from the serving exchange. In certain situations where it becomes necessary for the anchor exchange 400 to request certain call related information from the serving exchange 402 following a completed inter-exchange hand-off, the anchor exchange may originate an information request message (INFOREQ) 404 for delivery to the serving exchange. Parameters within the information request message 404 contain an identification of the type of information being requested from the serving exchange 402. For example, through certain parameter specifications, the message 404 may request the serving exchange 402 to provide information relating to mobile station position (e.g., geo-coordinates), mobile station location (e.g., serving switch identification, location area identification, or cell identification), serving cell functional and/or operational capabilities, type of voice channel being used by the mobile station (e.g., digital or analog), or mobile station stored information (e.g., data stored in a SIM card or in other memory within the mobile station). The information request message 404 may, if necessary, pass through as many tandem exchanges 406 as have remained connected in handling the call following inter-exchange hand-off. Responsive to receipt of the information request message 404, the serving exchange 402 acts on the included information type parameter as is appropriate (action 408) to obtain the requested information and originates an information request return result message (inforeq) 410 acknowledging receipt of the message 404 and returning in an included parameter the obtained requested information. The action 408 taken by the serving exchange 402 in response to receipt of the message 404 may be performed internally within the serving exchange (such as, for example, a simple data retrieval from exchange memory), or may require the initiation of another transaction (i.e., message exchange) 412 to obtain the requested information from another location within the network (such as, for example, from the mobile station or from another network node like a mobile positioning center (MPC).

Figure 3:
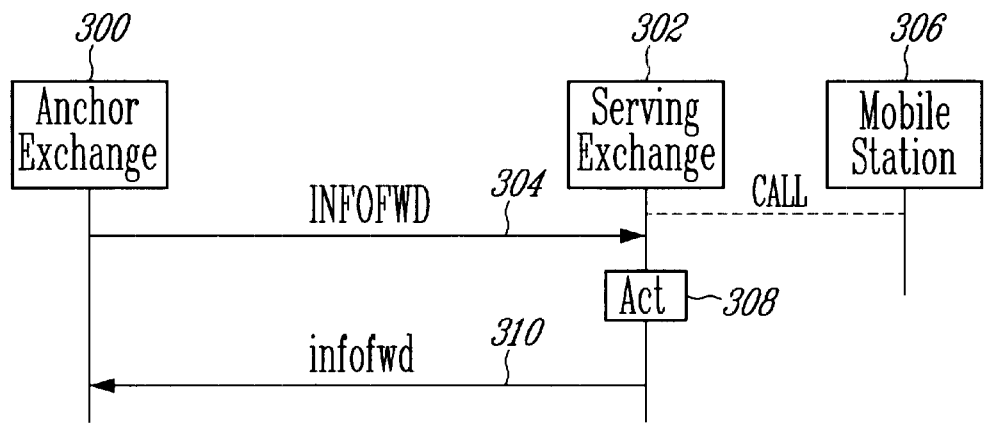
FIG. 3 is a message flow and network operation diagram illustrating operation of the network of FIG. 1 following an inter-exchange hand-off of FIGS. 2A–2B to push information from the anchor exchange to the serving exchange.

The information request message 404 may comprise a newly defined ANSI-41 message, a vendor proprietary extension to the ANSI-41 message set, or an enhancement to an existing ANSI-41 message. With respect to the last option, a parameter modification may be made to the existing ANSI-41 information forward message discussed above in connection with FIG. 3. More specifically, a new parameter may be added to the information forward message that specifically identifies that the message is not only capable of pushing information down to the serving exchange (although that could concurrently be performed if needed), but also identifies the type of information being requested from the serving exchange. Alternatively, an existing (perhaps unused or under used) parameter within the ANSI-41 information request message may be reassigned for use in identifying the type of information being requested from the serving exchange. Again, concurrent push down of information would be supported with such a parameter reassignment technique.

Figure 5:
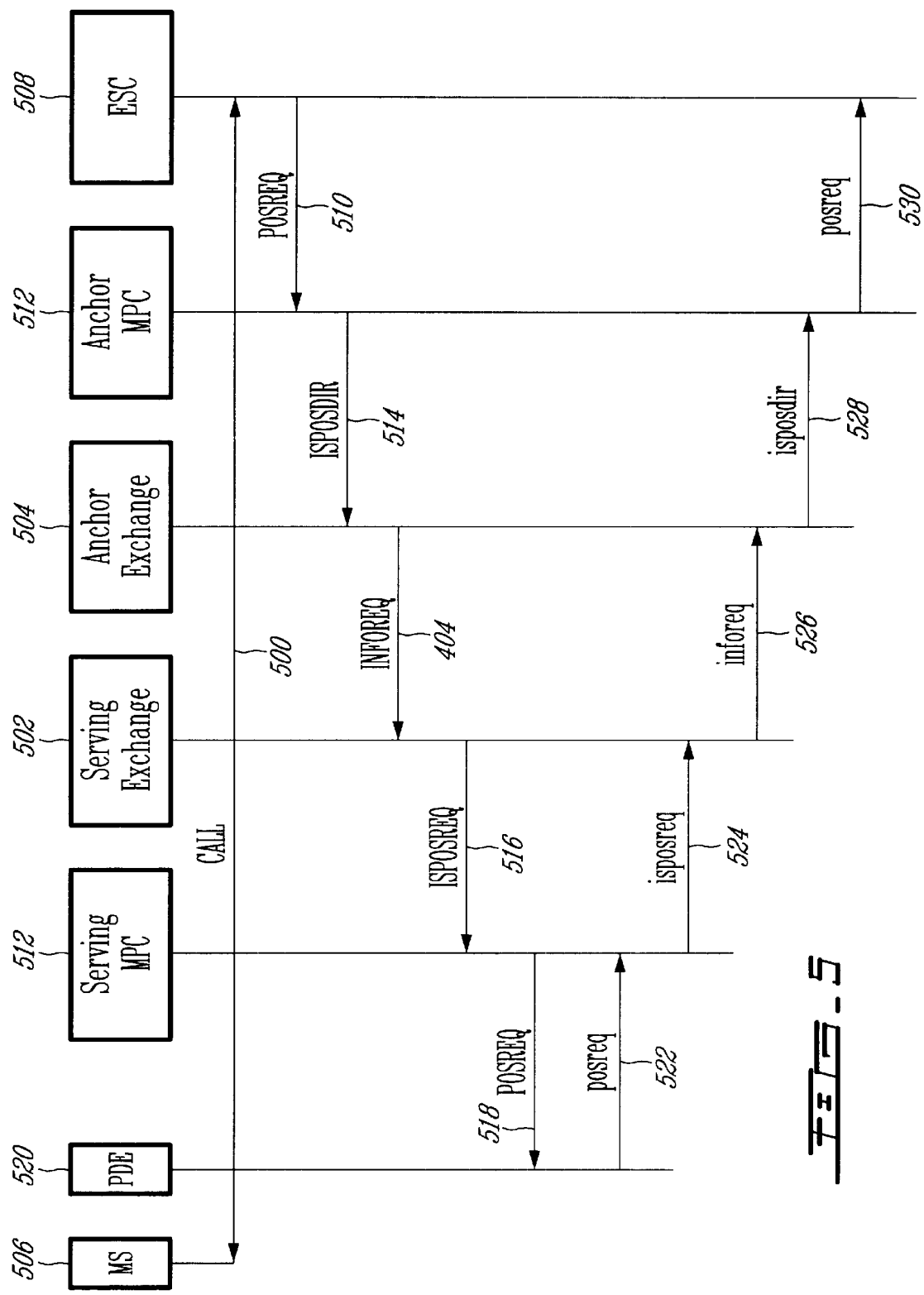
FIG. 5 is a message flow and network operation diagram illustrating use of an information request message in accordance with the present invention to request call related information following inter-exchange handoff of an emergency services call.

Reference is now made to FIG. 5 wherein there is shown a message flow and network operation diagram illustrating use of an information request message in accordance with the present invention to request call related information following inter-exchange hand-off of an emergency services call. An emergency services call (e.g., a 911 call) 500 is currently in existence and has proceeded through a completed inter-exchange hand-off. Thus, both a serving exchange 502 and an anchor exchange 504 are implicated in handling the call 500 between a mobile station 506 and an emergency services center 508. At some point in time it becomes necessary that the emergency service center 508 obtain the current position of the mobile station 506. A position request message (POSREQ) 510 is sent from the emergency services center 508 to a mobile position coordinator node 512 associated with the anchor exchange 504. The message 510 includes an identification of the mobile station 506 for which position information is being requested (e.g., originating cell information, mobile station identification, electronic serial number, international mobile station identity, and the like), and the type of position information desired (e.g., geo-coordinates, serving cell identification, and the like). Responsive to the message 510, the mobile position coordinator node 512 for the anchor exchange 512 sends an inter-system position directive message (ISPOSDIR) 514 to the anchor exchange 504. The anchor exchange 504 then recognizes that it must request this information on mobile station identification from the serving exchange 502. An appropriately formatted information request message 404 (see, also FIG. 4) in accordance with the present invention is then sent to the serving exchange 502. In response to the message 404, the serving exchange 502 acts to obtain the requested information (action 408 of FIG. 4) by sending the serving cell information and the radio channel information to a mobile position coordinator node 512 associated with the serving exchange 502 in an inter-system position request message (ISPOSREQ) 516. Responsive thereto, the mobile position coordinator node 512 associated with the serving exchange 502 sends a position request message (POSREQ) 518 to the position determining equipment 520. The equipment 520 utilizes one or more well known position determining techniques to determine a geographic position of the mobile station 506. The geo-coordinates for that determined position are then reported back to the mobile position coordinator node 512 associated with the serving exchange 502 in a position request return result message (posreq) 522. The coordinates are then forwarded on to the serving exchange 502 in an inter-system position request return result message (isposreq) 524, and sent on to the anchor exchange 504 in an information request return result message (inforeq) 526. The anchor exchange 504 then passes the coordinates on to the emergency services center 508 (by way of the mobile position coordinator node 512 associated with the anchor exchange 504) using an inter-system position directive return result message (isposdir) 528 and a position request return result message (posreq) 530.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In connection with a completed inter-exchange hand-off of a mobile station cellular call from an anchor exchange to a serving exchange, a method for supporting inter-exchange information requests, comprising the steps of:

signaling the serving exchange from the anchor exchange with a request for call related information;

processing by the serving exchange of the request to obtain the requested call related information; and signaling the anchor exchange from the serving exchange with a request return result including the obtained call related information comprising at least one of an information stored in the mobile station and serving cell capabilities.

2. The method as in claim 1 wherein the request comprises an ANSI-41 message including at least one parameter identifying the requested call related information.

3. The method as in claim 1 wherein the request comprises a message which is a vendor specific proprietary extension to an ANSI-41 message set, the message including at least one parameter identifying the requested call related information.

4. The method as in claim 1 wherein the request comprises an ANSI-41 information forward (INFOFWD) message including at least one parameter identifying the requested call related information.

5. The method as in claim 4 wherein the at least one parameter identifying the requested call related information is an additional parameter to any standard information forward message parameters within the ANSI-41 information forward message used to contain information to be pushed down to the serving exchange.

6. The method as in claim 1 wherein the step of processing comprises the step of initiating another transaction from the serving exchange to request the information from a source other than the serving exchange itself.

7. A cellular communications system, comprising:

an anchor exchange through which a mobile station cellular communication is initially being handled, and from which a request for call related information is issued following a completed inter-exchange handoff; and a serving exchange through which the mobile station cellular communication is currently being handled following the inter-exchange hand-off, the serving exchange operating, in response to the request issued by the anchor exchange, to obtain the requested call related information and report the obtained call related information to the anchor exchange, the call related information comprising at least one of an information stored in the mobile station and serving cell capabilities.

8. The system as in claim 7 wherein the request comprises an ANSI-41 message including at least one parameter identifying the requested call related information.

9. The system as in claim 7 wherein the request comprises a message which is a vendor specific proprietary extension to an ANSI-41 message set, the message including at least one parameter identifying the requested call related information.

10. The system as in claim 7 wherein the request comprises an ANSI-41 information forward (INFOFWD) message including at least one parameter identifying the requested call related information.

11. The system as in claim 10 wherein the at least one parameter identifying the requested call related information is an additional parameter to any standard information forward message parameters within the ANSI-41 information forward message used to contain information to be pushed down to the serving exchange.

12. The system as in claim 7, the serving exchange further operating to initiate another transaction to request the information from a source other than the serving exchange itself.

* * * * *